US005475799A

United States Patent [19]

Yoshioka et al.

[11] Patent Number: 5,475,799

[45] Date of Patent: Dec. 12, 1995

[54] METHOD OF MODELING SHAPES USING A COMBINATION OF DIFFERENT SHAPES TO REPRESENT THE RESULTANT SHAPE

[75] Inventors: Taijiro Yoshioka, Nara; Shuichi Hamada, Hirakata, both of Japan

[73] Assignee: Matsushita Electric Industrial Co., Ltd., Kadoma, Japan

[21] Appl. No.: 162,365

[22] Filed: Dec. 7, 1993

Related U.S. Application Data

[63] Continuation of Ser. No. 967,544, Oct. 27, 1992, abandoned, which is a continuation of Ser. No. 446,563, filed as PCT/JP89/00366, Apr. 5, 1989, abandoned.

[30] Foreign Application Priority Data

Apr. 7, 1988 [JP] Japan .................................. 63-85871

[51] Int. Cl.⁶ ................................................... G06T 17/20
[52] U.S. Cl. ............................................ 395/120; 395/123
[58] Field of Search ..................................... 364/521, 522, 364/474.24; 395/120, 141, 123

[56] References Cited

U.S. PATENT DOCUMENTS

| 4,736,306 | 4/1988 | Christensen et al. | 364/522 X |
| 4,791,579 | 12/1988 | Kranitzky | 395/120 |
| 4,821,214 | 4/1989 | Sederberg | 364/522 |
| 4,956,787 | 9/1990 | Ito et al. | 364/474.24 |
| 4,972,330 | 11/1990 | Matsushiro et al. | 364/521 |
| 5,197,013 | 3/1993 | Dundorf | 364/474.24 |

FOREIGN PATENT DOCUMENTS

| 62-105271 | 5/1987 | Japan . |
| 63-3375 | 1/1988 | Japan . |

*Primary Examiner*—Mark K. Zimmerman
*Attorney, Agent, or Firm*—Cushman, Darby & Cushman

[57] ABSTRACT

A method of modeling shapes to produce output data indicative of the shapes. Each of the shapes is divided into existing shapes, and removal shapes to be removed from the existing shapes to define a final shape. The two-dimensional cross-sections of the existing shapes and the removal shapes are divided into straight lines and arcs of circles and are used to form a two-dimensional wire frame representing the two-dimensional cross-section. This wire frame is then expressed as a loop information data set that includes an aggregation of data describing the elements. Existing parts of the final shape are expressed as an existence mode, and shapes to be removed from the existing shapes to define the final shape are expressed in a removal mode. Any of the surfaces of the object outside the plane including the wire frame are expressed based on planes or curved planes. Output data representing the final shape is provided based on the loop information expressed as the existing parts and the removal parts.

12 Claims, 13 Drawing Sheets

Fig. 1

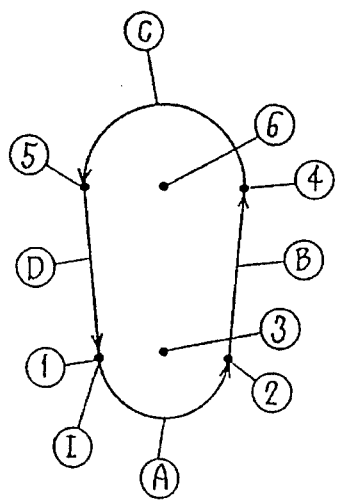

Fig. 2

| Loop property part (stationary length) | Name of loop | | |
|---|---|---|---|
| | Range of height (depth) | | |
| | Attribute number of loop | | |
| | Range in plane | | |
| | Number of element | | |
| Loop data part (variable length) | Start element | Name of element and type | ①/ POINT |
| | | Property value of element | |
| | | Coordinate value | Coordinate of point① |
| | #2 element | Name of element and type | Ⓐ/ ARC |
| | | Property value of element | |
| | | Coordinate value | Coordinate of point② coordinate of point③ |

| Curved surface property part (stationary length) | Type number of curved surface equation | |
|---|---|---|
| | Maximum degree | |
| | Number of kind of coefficient | |
| Coefficient part (variable length) | $a_1$ | Coefficient value |
| | $a_2$ | " |
| | $a_3$ | " |
| | $a_4$ | " |

Fig. 7(a)
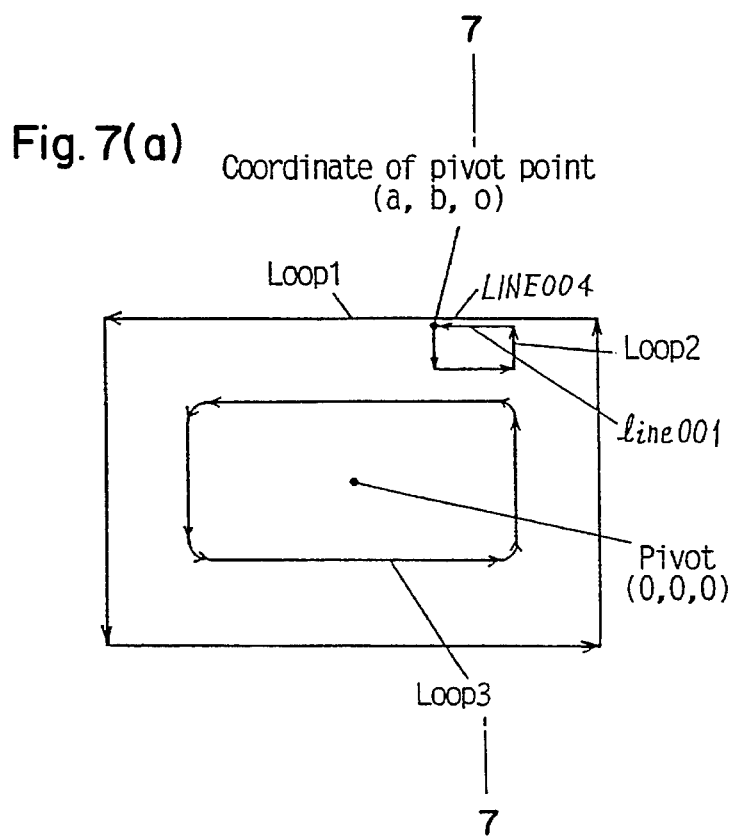
Fig. 7(c)
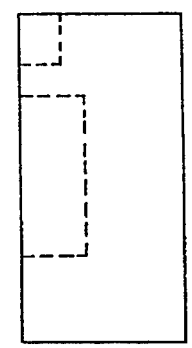
Fig. 7(b)
| Name of loop | Existence mode | Coordinate of pivot point | Coordinate of lever point | Dependence | |
|---|---|---|---|---|---|
| | | | | Name of loop | Name of element |
| Loop1 | Existence | 0,0,0 | 0,0,0 | | |
| Loop2 | Removal | a,b,o | line 001 | Loop1 | LINE 004 |
| Loop3 | Removal | 0,0,0 | 0,0,0 | | |

Fig. 10(e)

```
0/* IMCCUT1      CUTTER         CANON. ***********************************/
  DCL CUTPTR1    PTR;                      /* BASE PTR                 */
  DCL 1 IMCCUT1  BASED(CUTPTR1),           /*                          */
      2 CUTID   CHAR(2) INIT('MC'),        /* ELEMENT ID.              */
      2 CUTCD   FIXED BIN(15) INIT(213),   /* ELEMENT CODE             */
      2 CUTFLG  BIT(16) ALIGNED INIT('0'B),/* FLAG                     */
      2 CUTSW      BIT (16),               /* BIT 1 ON :         Edge  */
                                           /* BIT 2 ON :Additional Edge*/
                                           /* BIT 3 ON :Partial   Edge */
      2 CUTNM      FIXED BIN(15),          /* Kind of cutting edge     */

/* 1 --- > Out              */
                                           /* 2 --- > In               */
                                           /* 3 --- > Out,in           */
                                           /* 4 --- > Offset of edge   */

2 CUTWK     FIXED BIN(15),           /* WORK                     */
      2 CUTWK2    FIXED BIN(31),           /* WORK                     */
      2 CUTANG    FLOAT DEC(16),           /* ANGLE   (Forming)        */
      2 CUTSZ1    FLOAT DEC(16),           /* SIZE 1  (Forming)        */
      2 CUTSZ2    FLOAT DEC(16),           /* SIZE 2  (Forming)        */
      2 CUTSZ3    FLOAT DEC(16);           /* SIZE 3  (Forming)        */
                                           /*   <===== IMCCUT1         */
```

Fig. 10(f)

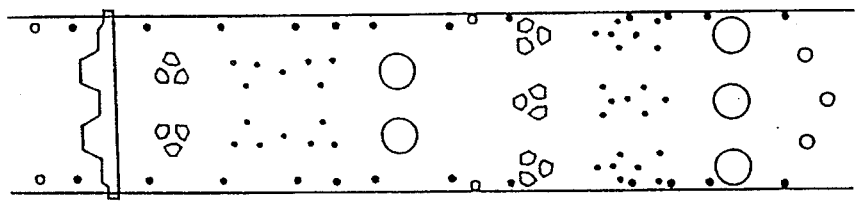

Fig. 11

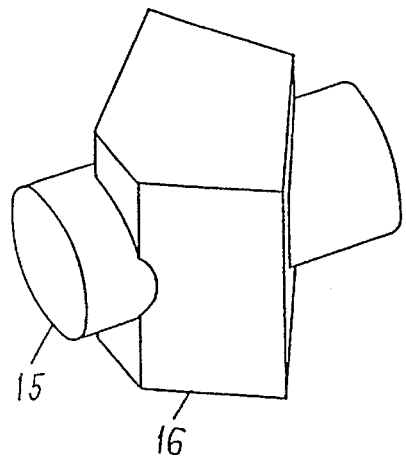

F I G.12
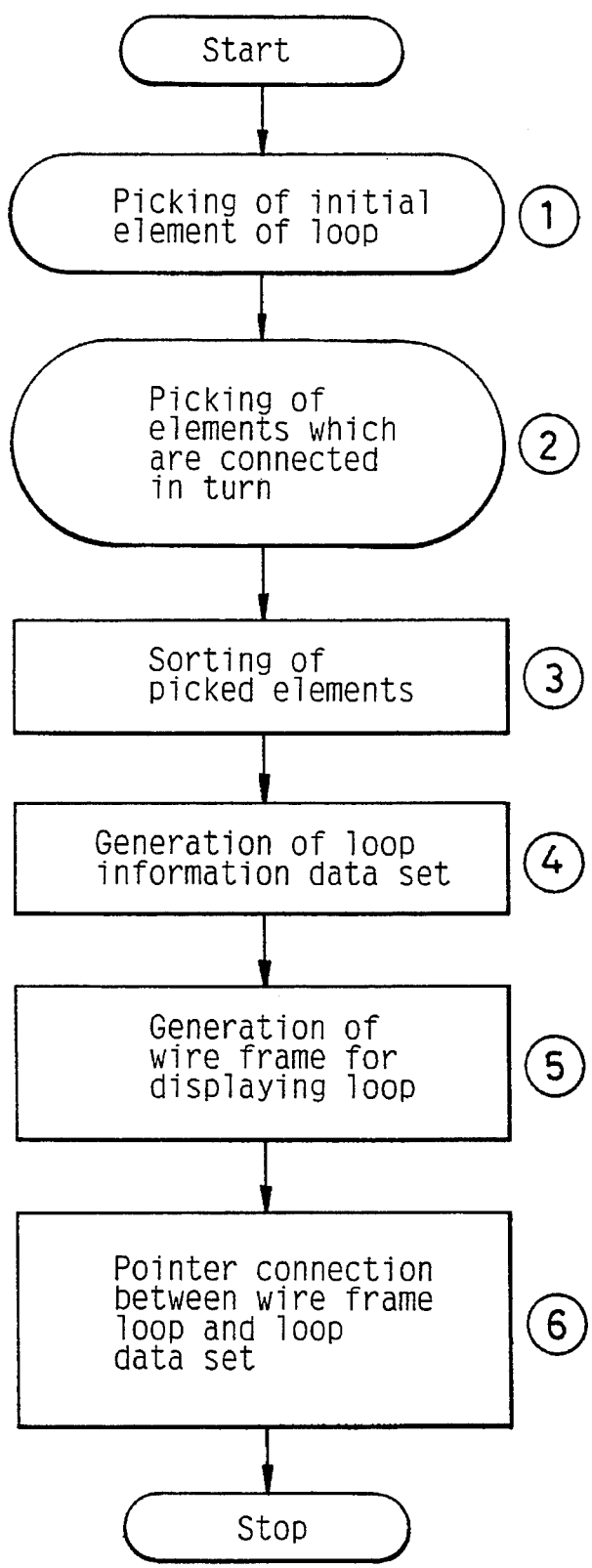

METHOD OF MODELING SHAPES USING A COMBINATION OF DIFFERENT SHAPES TO REPRESENT THE RESULTANT SHAPE

This is a continuation of application Ser. No. 07/967,544, filed on Oct. 27, 1992, which was abandoned upon the filing hereof which is a continuation of Ser. No. 07/446,563, filed Dec. 7, 1989, now abandoned, which is a CIP of Intl. Appln. PCT/JP89/00366, which designated U.S., filed Apr. 5, 1989, now abandoned.

BACKGROUND OF THE INVENTION

1. Field of the Invention

The present invention relates to a solid modeling method which is intended to be used in a CAD (Computer-Aided Drafting) system directed to a structural object which has a component in which two-dimensional boundary geometry and the maximum and the minimum values of an existence domain in a depth (or height) direction with regard to a base plane is univocally given to the base plane and a structure which is composed of the component.

2. Background Art

A solid modeling method method has been used in CAD as a data structure for representing solid-geometry, B-reps (Boundary representation) and CSG (Constructive Solid Geometry). A complete geometric representation of an object is performed by these methods.

In the method using the B-reps, since it is important to represent accurately a three-dimensional solid geometry, the data structure is liable to become very large and complex, therefore much processing time is required in this application.

In a three-dimensional NC process in which shapes of complex curved surfaces are required to be treated with accuracy, the foregoing B-reps method is effective. However, in a field in which the shape is not so three-dimensionally complex, but an artificial intelligence (AI) is used, and a solid-like treatment is required in order that a human and a computer give the same interpretation to a figure and a meaning represented by it, the B-reps method represents too much load on the processing of the computer.

On the other hand, although the method using CSG represents an object by a set operation of primitives such as a sphere, a parallelepiped, a cone or the like, problems remain in treatment where tolerance or roughness in each side or surface of an objective primitive is different from each other, since the method for representing the geometric element of side, plane or the like composing a primitive by structural representation is not yet established. Moreover, in a CAD system having a data structure of two-dimensional and three-dimensional wire frames which are widely utilized in the market, the CSG method has not been usable.

DISCLOSURE OF THE INVENTION

An object of the present invention is to provide a solid modeling method which can handle in a solid model-like manner an object which is not so complicated with respect to dimension by reduced data processing.

In order to attain the foregoing object, in the present invention, in relation with two-dimensional wire frame information which is defined on the CAD system, on a plane representing a design object, respective neighboring elements of a two-dimensional wire frame boundary information which are chained loop-like is defined as the minimum unit in representation of the design object, and furthermore the design object is represented by two dimensions and three dimensions by giving both end surfaces determining presence of the design object by curved surface equation representation or coordinate which is perpendicular to the above-mentioned plane, to represent an object substance which is formed by a set operation of respective looped geometry units by designating "existence mode" or "removal mode" on respective looped geometries.

BRIEF DESCRIPTION OF THE DRAWINGS

FIG. 1 is a conceptual figure of a loop information;

FIG. 2 is a figure showing an example of content of a loop information/data set;

FIGS. 7(a)–7(b) are figures showing an example representing an object composed of a set of plural loops by loop data;

FIGS. 10(a)–10(f) are figures showing an example of two-dimensional loop solid applied to a design of a progressive press die;

FIG. 11 is a figure showing an example of a loop solid formed in three dimensions, applied to design of a mechanical component;

FIG. 12 is a flow chart of a method for generating loop data;

BEST MODE FOR CARRYING OUT THE INVENTION

Hereafter, first, a principle of the solid-modeling method of the present invention is elucidated with reference to the figures and a flow chart of FIG. 12.

In the present invention, as shown in FIG. 1, one of the end points of a figure element is assigned a direction as a starting point and the other is assigned a direction as an end point, in order to give a strict distinction between inside or outside of the object on the basis of a boundary geometry showing the representing object, from information of a conventional two-dimensional wire frame CAD system. Boundary forming elements are connected in turn along a predetermined direction and are grouped (Steps 1, 2 of FIG. 12). The example of FIG. 1 shows a loop composed of two arcs A, C and two straight lines B, D, and when the starting point is I, they are connected in the order A, B, C, D. At this time, elements on which the coordinates of the starting point and the end point are in a range of error are made of connecting condition (Step 3).

Thereby, the connecting relation between the geometry and coordinates (in the case of an arc, the coordinate of the center is added) of the figure connection point of geometry elements (straight line, arc, point) for connecting are described on one canonical format along a predetermined direction, to make a loop information data set of variable length (see FIG. 2) (Step 4). I, A and connecting points 1, 2 in FIG. 2 correspond to FIG. 1.

The above-mentioned method is effective when the respective figure elements are connected at the end point of the figure elements. On the other hand, when the figure elements cross each other, a loop information data set can be made by sequentially choosing an element between crossing points.

Figures 3A, 3B:
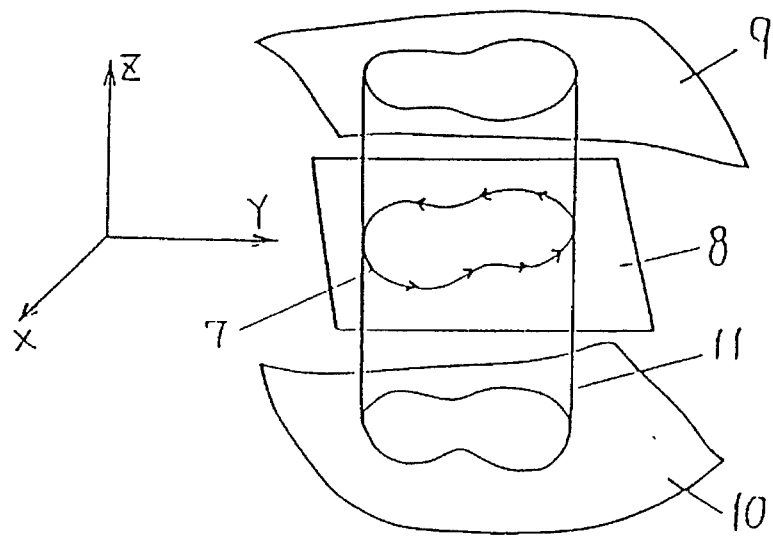
FIGS. 3(a) and 3(b) are conceptual figures in case that a two-dimensional loop is made to a three-dimensional primitive.

Moreover, in the loop information data set, a height (or depth) from a base plane (X-Y plane, etc.) of the object figure is described as to both end planes with respect to a three-dimensional coordinate system including the base plane, by mathematical expression which is univocally determined in an arbitrary coordinate with respect to the base plane; and as shown in FIG. 3(a), a cylindrical domain composed of a product set of a half space domain, in which the boundary geometry of a loop 7 is projected perpendicular or in taper-shape or with an arbitrary tilted angle, with respect to the generating plane 8 defining the loop 7, defined in the space surrounded by two curved surfaces 9, 10 as one primitive of an expanded CSG method for forming a three-dimensional solid geometry 11; and the maximum/minimum domain (height value) occupied in vertical direction with respect to the generating plane 8 defining the loop is described as data of the range of the height (depth) of the loop characteristic part. When a curved surface equation is not a horizontal plane, as shown in FIG. 3(b), the coefficient of the curved surface equation is described by predetermined data sets, thus enabling reference to the contents of the data sets of the curved surface equation, which is an object, by pointer from the loop data set. In this way, three-dimensional solid geometry can be handled as well as two-dimensional geometry. Furthermore, search of a necessary information of attribute data set other than the figure becomes possible by connecting by pointer or the like from a represented figure element, for example by tracing a series of pointer connection information.

Figure 4:
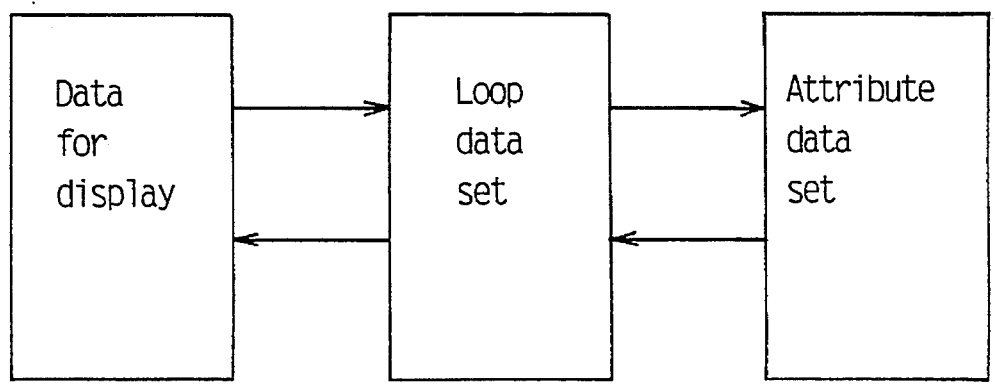
FIG. 4 is a conceptual figure showing an example of linking by a pointer between data.

FIG. 4 conceptually shows an example of a link by means of pointer between data (wire frames) for display and property data, with a loop data set at its center (Steps 5, 6).

The loop information data set which is made in this manner stores therein geometric information of the figure in structural form, and can make a program for newly generating a loop geometry in a representing form of wire frame or the like on a display of the CAD, from the loop information data set. Moreover, a program for obtaining property value (area, circumference length, the center of gravity, volume, etc.) or for obtaining relative property value (existence of interference, minimum distance, etc.) can be made.

Figure 5A:
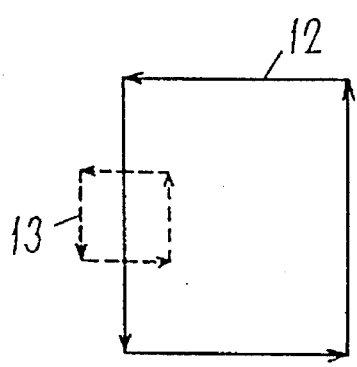
FIGS. 5(a)–5(d) are conceptual figures of set operations of loop data.
Figure 5B:
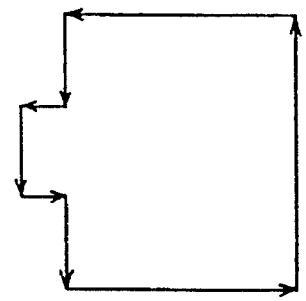
Figure 5C:
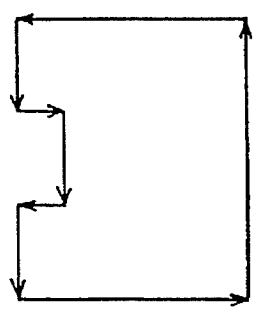
Figure 5D:
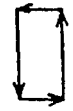
Figure 13:
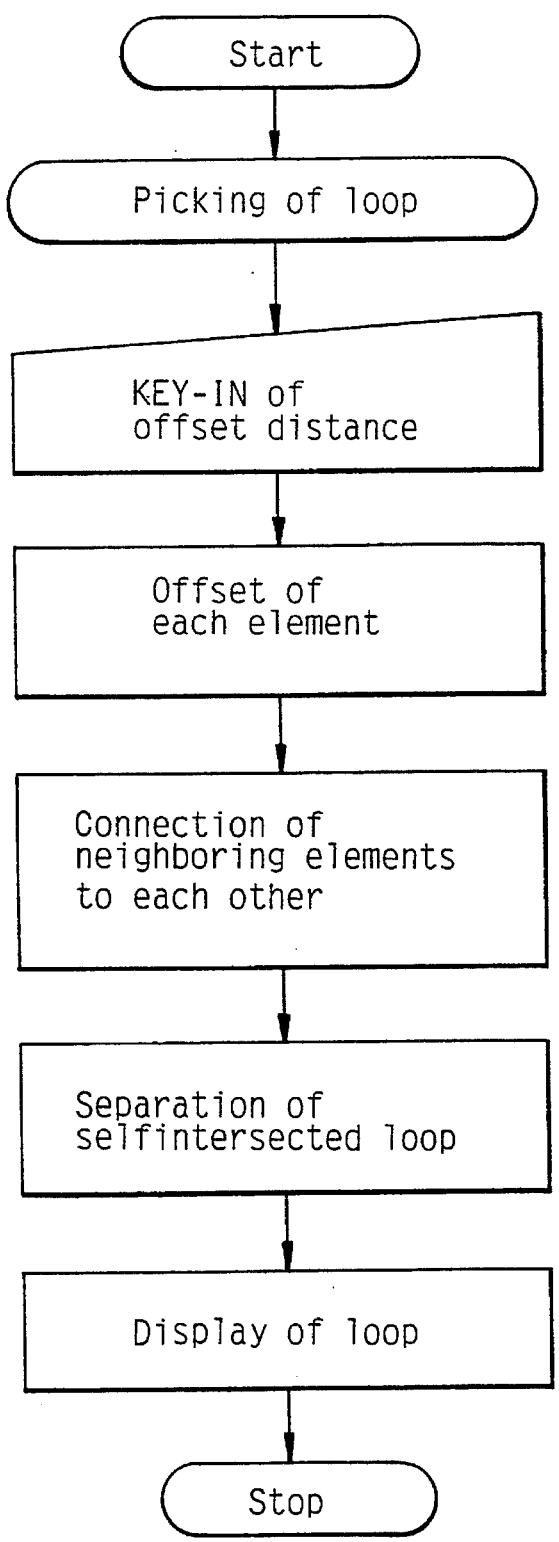
FIG. 13, FIG. 14, and FIG. 15 are flow charts of operations of the loop data.
Figure 14:
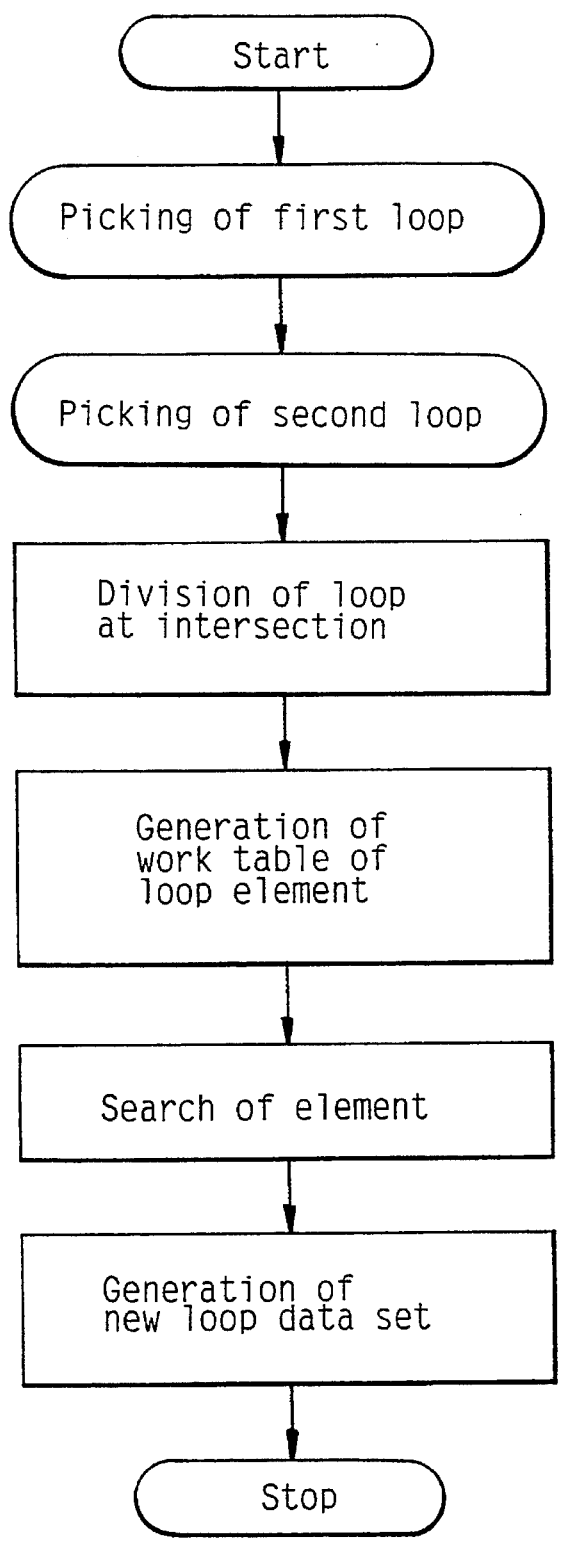

Furthermore, according to the method of the present invention, since a program for producing a relation between elements of a figure forming a loop can be easily created, a program for performing shape deformation such as an offset or a stretch of the geometry is created by addition, removal replacement, etc. of the forming elements of a loop. This can maintain the connecting state of the loop, or perform a set operation (sum, difference, product) of geometries between the loop as shown in FIGS. 5(a)–5(d) and a flow chart of FIG. 13, and another loop FIGS. 5(a)–5(d) conceptually show a set operation between the loop 12 and the loop 13, and shows forming different loops including a sum of sets in FIG. 5(b), a difference of sets in FIG. 5(c), or a product set in FIG. 5(d) on the basis of the loops 12 and 13 which are shown in FIG. 5(a). The above-mentioned operation is shown by a flow chart of FIG. 14.

According to the method of the present invention, a deformation process etc. relating to the geometry is realizable by a combination of the above-mentioned general purpose process to the loops which are handled in the actual design. The process is shown in FIGS. 6(a)–6(f).

Figure 6A:
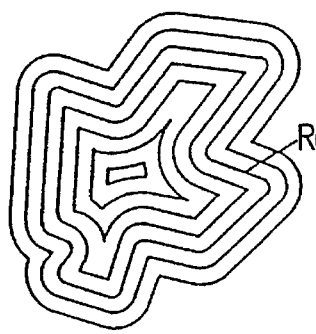
FIGS. 6(a)–6(f) are figures illustrating function of a process operation routine of a loop geometry.
Figure 6B:
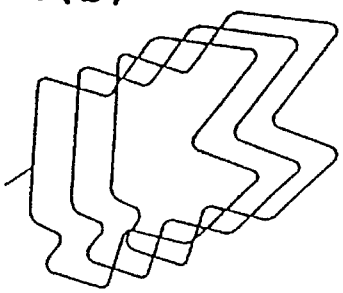
Figure 6C:
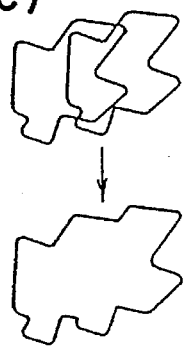
Figure 6D:
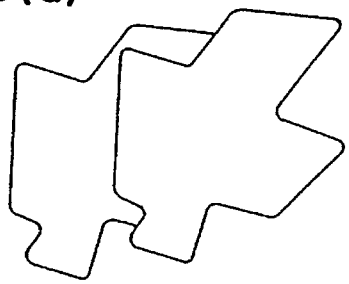
Figure 6E:
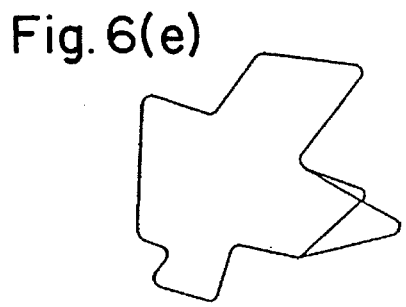
Figure 6F:
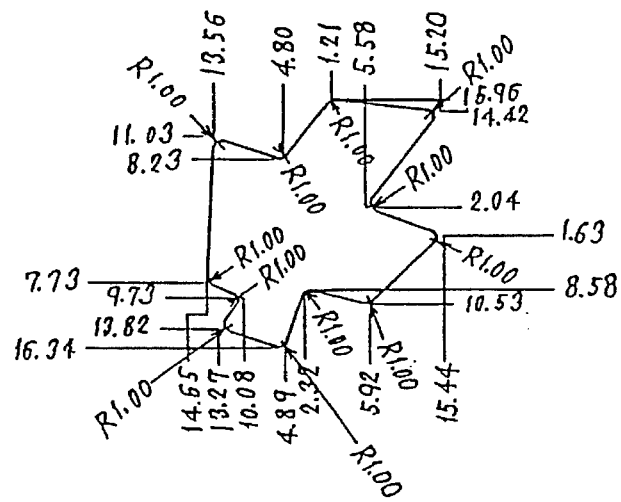
Figure 15:
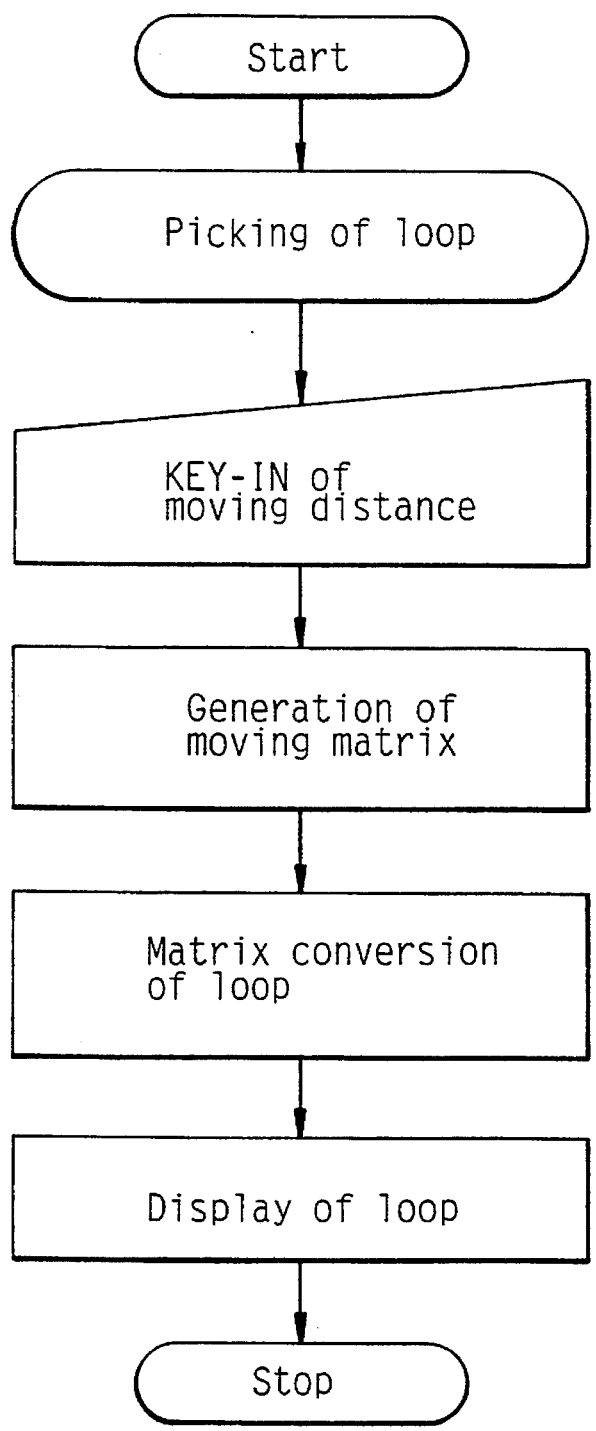

FIG. 6(a) shows a state wherein a origin datum (reference) is offset inside and outside. FIG. 6(b) shows a state wherein the same loop geometry is copied by multiplying the origin datum loop by a place movement matrix. FIG. 6(c) shows the sum of sets of loops, and FIG. 6(d) shows a state wherein the upper and lower relation and arrangement between two loops are defined, and shows a portion on which the lower loop geometry overlaps upper loop geometry is hidden. FIG. 6(e) shows a state wherein an arbitrary one corner of the loop is stretched, while FIG. 6(f) shows a state wherein dimension lines are generated. These processes are automatically performed. The above-mentioned operation is shown by a flow chart of FIG. 15.

FIG. 7(a) shows an example wherein an object which is composed of a set of plural loops is represented by defining these several loops, and defining the presence mode and removal mode of each of these loops.

A design object is shown in FIG. 7(a), and in cross-section along the line 7—7 in FIG. 7(c). This object is represented as a loop information data set group as shown in the FIG. 7(b), and each loop included therein is defined as existence mode or removal mode depending on whether it represents real existence or a void which is to be removed from the existing part. A relative restricting relation is represented as attribute information of the loop information data set.

Figure 8:
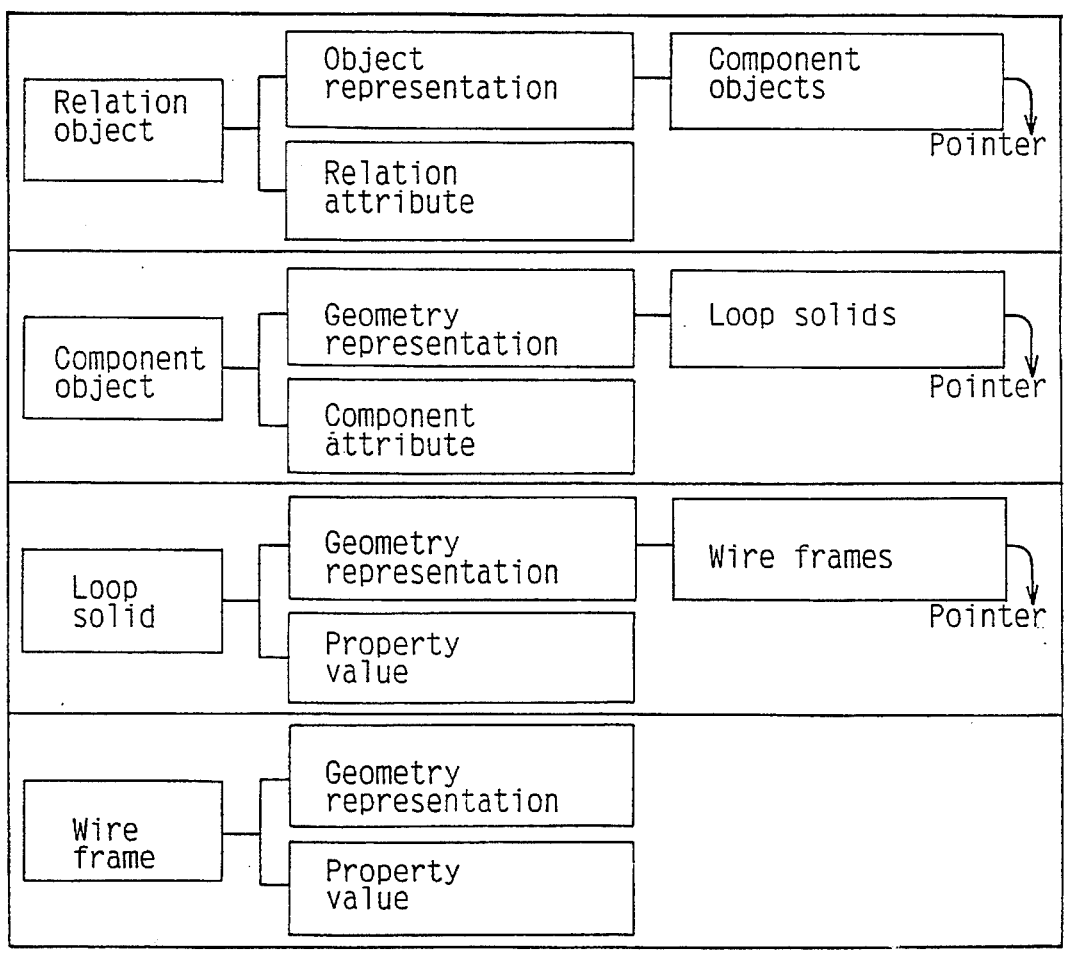
FIG. 8 is a figure showing state representing relation between plural components in stratum-configuration.

Moreover, FIG. 8 typically shows a state represented by means of stratum-form by representing a loop solid from a wire frame group and by representing a component object of a design object from a loop solid group and by making a relation between plural components to a relational object, and also shows a state in which those are linked by using both-direction-pointer.

As is apparent from FIG. 8, according to the method of the present invention, the design object is represented in stratum-form by a wire frame level, single loop level, a compound loop level and those relational level and object representation which is called an object.

Figure 9:
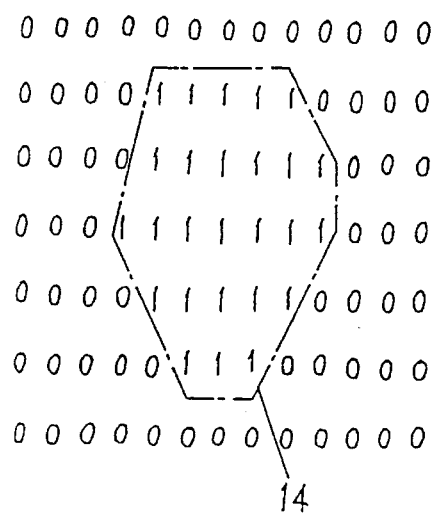
FIG. 9 is a figure representing an arbitrary loop geometry by a bit-pattern.

Another aspect of the method of the present invention is shown in FIG. 9, and sets a space grid of an arbitrary size on a space which surrounds the loop information data set group. A program for determining whether the respective grid points are inside or outside of the loop is created, and bit of "0" or "1" is placed for each grid point, and a bit array in compliance with the size of the grid (arrangement) is made, then rough geometry recognition can be performed by treating the bit array as a pattern. Here, element number 14 designates the boundary line of the loop.

FIGS. 10(a)–10(f) shows an example in which a two-dimensional loop solid in accordance with the present invention is applied to design of a progressive press die.

Figure 10A:
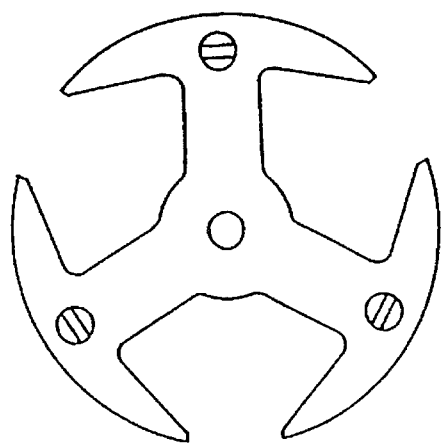
Figure 10B:
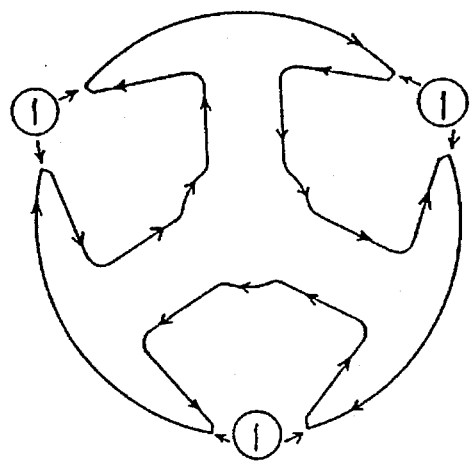
Figure 10C:
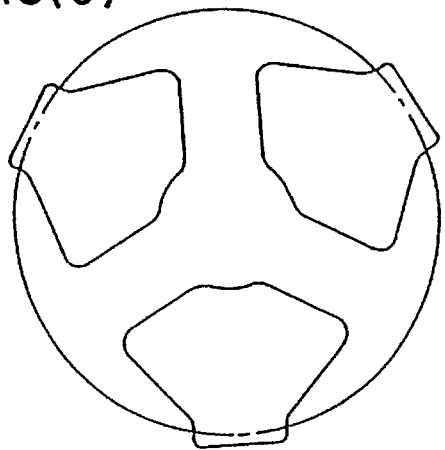
Figure 10D:
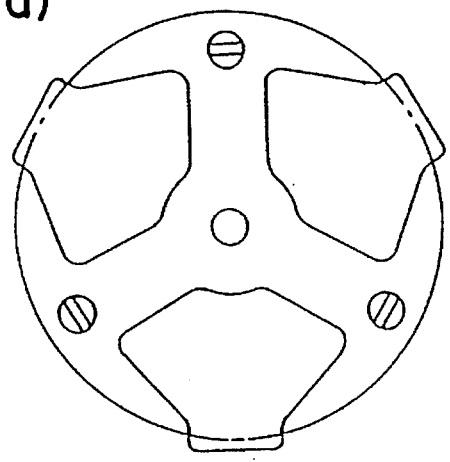

FIG. 10(a) shows a product shape, and FIG. 10(b) shows a peripheral loop shape of the drawing of the product shape of FIG. 10(a). An arrow designates a direction of the loop, and a point 1 designates a corner point determined by a concave/convex check. The FIG. 10(c) represents a cutting edge loop which is automatically made from the FIG. 10(b), and FIG. 10(d) represents the cutting edge shape combined with other cutting edge loops. FIG. 10(e) shows content in which cutting edge characteristic canon which is linked to the cutting edge loop is represented by PL/I. FIG. 10(f) represents a final layout of a hoop material.

These figures will now be described in further detail. In FIG. 10(a), the product shape is represented by a two-dimensional wire frame on a CAD system, and a designer performs a picking operation of shape from the information in turn, and creates data set of loop information. The wire frame used to create the loop is erased automatically or by instruction of the designer, and a wire frame on which pointer is connected with a loop information set is generated and is displayed.

In order to automatically make a press trimming shape (cutting edge shape) from the figure of the looped product shape, for example as shown in FIG. 10(b), the concave/convex portions of the shape are determined during checking of neighboring tangential angles among elements composed of the shape, and plural loops shown in FIG. 10(c) are produced from one loop.

In order to attach a meaning as a cutting edge and a property that what type of the cutting edge is to the cutting edge loop produced in this way, a cutting edge characteristic data set as shown in FIG. 10(d) is made and connected to each loop with the pointer. Thus, property value is made to be referred to the loop as the shape.

Subsequently, a layout design for press working is accomplished. When the designer arranges the group of the foregoing cutting edge shapes within a width of a hoop material which was previously given, an area of each loop can be summed, and a yield rate of the material can be calculated, or calculation of the minimum distance between neighboring cutting edges (loops) can be automatically calculated, and hence an optimum pitch and a step number can be determined by these results.

Subsequently, the designer decides which cutting edges are placed on which step (FIG. 10(f)). On the basis of content decided by the designer, contents such as involving relation between cutting edges, a center position of a shearing force moment of the cutting edge after arrangement can be confirmed.

Subsequently, offset operation of respective clearance parts of shape for punch, shape for die, shape for stripper is operated on the cutting edge loop arranged by the layout on the basis of the respective cutting edge properties, and process advances to design of element components of the die.

FIG. 11 shows an example of a loop solid which is represented in three-dimensions in accordance with the present invention and applied to design of mechanical component. A loop geometry is defined on an arbitrary plane on a space, and a complex geometry can be defined by set operation between primitives 15 and 16, defining that the space composed of a half space surrounded by curved surfaces of both ends is primitives 15 and 16.

Figure 16:
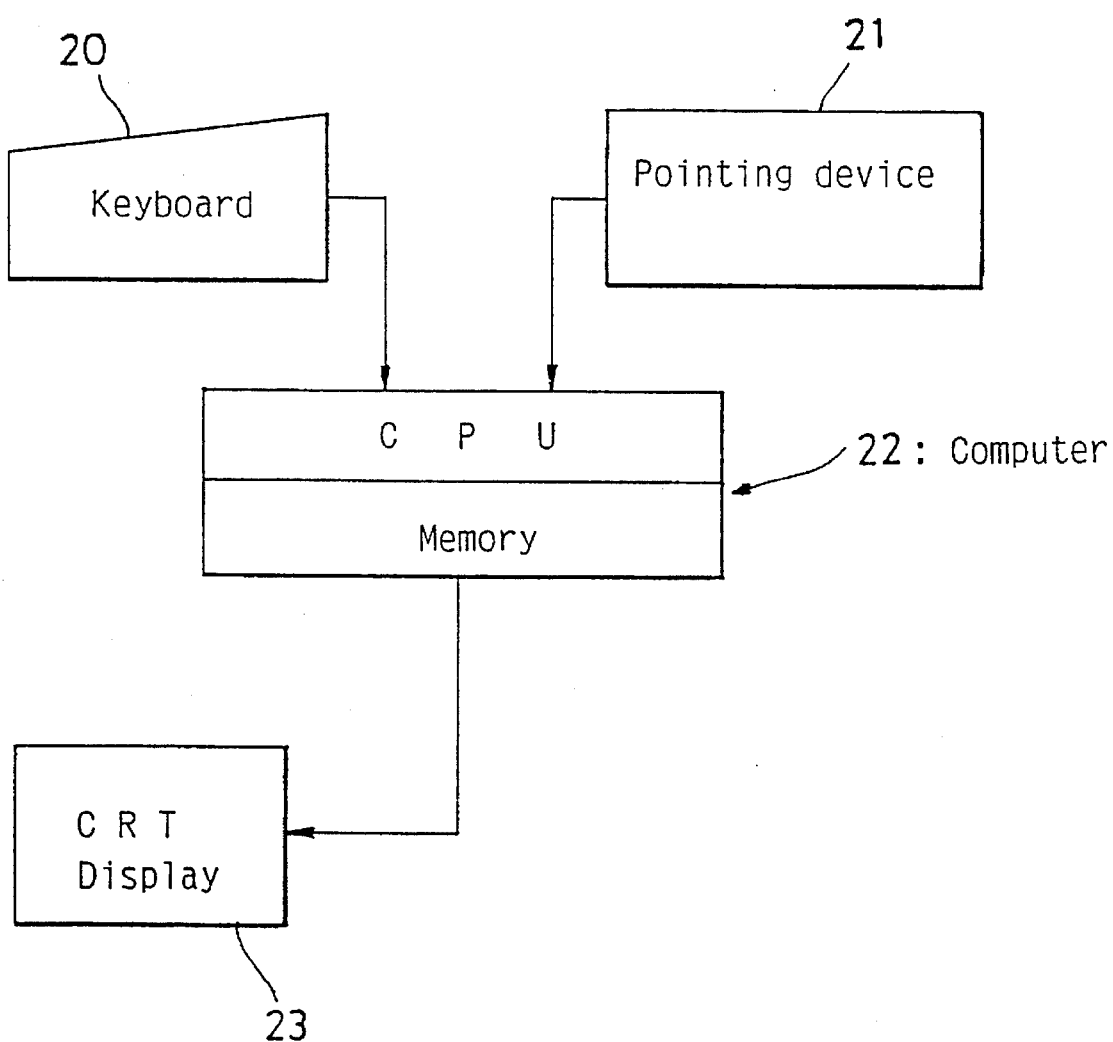
FIG. 16 is a block diagram of an apparatus for applying the solid modeling method.

The above-mentioned process of the solid modeling method is carried out by an apparatus shown in FIG. 16. Referring to FIG. 16, data of an object to be processed is inputted to a computer 22 comprising a CPU and a memory with a keyboard 20. The picture of the object is displayed on a CRT display 23, and a position of the picture displayed on the CRT display is picked up with a pointing device 21 such as a "mouse".

As mentioned above, according to the present invention, since human being and a computer can equally interpret a figure and meaning represented by the figure, a solid modeling which does not impose a load on the computer is possible. Therefore, design which the designer hitherto has proceeded in dialogue manner can be programmed and automatized as a combination of shape operation of generalized loop and shape recognition process.

Furthermore, exclusive software which enables solid model-like handling can be constructed even in the world of two-dimensional wire frames by introducing this data structure into the conventional CAD system.

Moreover, the solid in the present invention is a compound solid model which has both the advantages of B-reps method and easy operation which is the advantage of CSG method, and can handle a space with bit array as its application function, and can expand applicable field of CAD, since many property data can be called out depending on necessity.

We claim:

1. A solid modeling method for producing information representing a shape of an object, comprising the steps of:

dividing a two-dimensional cross-section of an object into existing shapes, and removal shapes to be removed from said existing shapes to define a final shape;

dividing said two-dimensional cross-section of said existing shapes and removal shapes which define said final shape of said object into elements including straight lines and arcs of circles;

forming a two-dimensional wire frame in a first plane, said wire frame representing said two-dimensional cross-section of said object by connecting neighboring ones of said elements;

expressing said wire frame by a loop information data set which includes an aggregation of data describing said elements;

expressing said existing shapes in said loop information data set of said final shape of said object by an existence mode, and expressing said removal shapes in said final shape of said object by a removal mode;

determining additional surfaces of said object, which are outside said first plane including said wire frame, and expressing geometrical surfaces which define said surfaces outside said first plane;

providing output data representing said final shape based on said loop information data set expressed as existing shapes and removal shapes and said additional surfaces; and defining attribute information other than said shape information in said loop information data set and linking said attribute information to said loop information to provide further information about contents of said loop information data set.

2. A solid modeling method in accordance with claim 1 comprising a further step of deforming said shape of said object, by adding, deleting or replacing a removal element to said loop information data set.

3. A solid modeling method in accordance with claim 1 comprising the further step of deforming said shape of said object using a sum of sets, a difference of sets or a product set between at least two loop information data sets.

4. A method of modeling a shape of an object, comprising the steps of:

determining a plurality of closed shapes which, when combined, define a final shape of said object;

dividing each of said closed shapes into elements, each element including one of a straight line and an arc of a circle;

determining data which represents each of said elements including a position of said element and a shape of said element, at least one of said shapes including an arc of a circle;

forming a loop information data set as an aggregation of said data representing said elements;

providing existence data in said loop information data set, which represents whether each of said plurality of closed shapes represents an existence mode indicative of a shape to be included or a removal mode indicative of a shape to be removed; and providing output information indicative of said final shape based on said loop information data set and said existence data;

wherein said method also comprises a step of defining attribute information other than said shape information of said object which is composed of loop information data sets and representing said content of said object by linking said attribute information to said object.

5. A method of modeling a shape of an object, comprising the steps of:

determining a plurality of closed shapes which, when combined, define a final shape of said object;

dividing each of said closed shapes into elements, each element including one of a straight line and an arc of a circle;

determining data which represents each of said elements including a position of said element and a shape of said element, at least one of said shapes including an arc of a circle;

forming a loop information data set as an aggregation of said data representing said elements;

providing a mode attribute in said loop information data set, said mode attribute being data having one of a plurality of possible values including an existence value indicating one of said plurality of closed shapes is indicative of a shape to be included and a removal value indicating one of said plurality of closed shapes is indicative of a shape to be removed;

providing output information indicative of said final shape based on said loop information data set and said mode attribute; and defining attribute information other than said shape information of said object which is composed of loop information data sets and representing said content of said object by linking said attribute information to said object.

6. A solid modeling method for producing information representing a shape of an object, comprising the steps of:

selecting, based on information representative of a final shape representing a two-dimensional cross-section of an object, existing shapes and removal shapes to be removed from said existing shapes to define said final shape, said existing and removal shapes being selected based on said final shape;

dividing said two-dimensional cross-section of said existing shapes and removal shapes which define said final shape of said object into elements including both straight lines and arcs of circles;

forming a two-dimensional wire frame in a first plane, said wire frame representing said two-dimensional cross-section of said object, by connecting neighboring ones of said elements;

expressing said wire frame by a loop information data set which includes an aggregation of data describing said elements;

expressing said existing shapes in said loop information data set of said final shape of said object by an existence mode, and expressing said removal shapes in said final shape of said object by a removal mode;

determining additional surfaces of said object, which are outside said first plane including said wire frame, and expressing geometrical surfaces which define said surfaces outside said first plane; and providing output data representing said final shape based on said loop information data set expressed as existing shapes and removal shapes and said additional surfaces.

7. A solid modeling method in accordance with claim 6 comprising a further step of deforming said shape of said object, by adding, deleting or replacing a removal element to said loop information data set.

8. A solid modeling method in accordance with claim 6 comprising the further step of deforming said shape of said object using a sum of sets, a difference of sets or a product set between at least two loop information data sets.

9. A method of modeling a shape of an object, comprising the steps of:

determining, based on information representative of a final shape of said object, a plurality of closed shapes which, when combined, define said final shape of said object, each of said plurality of closed shapes being determined based on said final shape of said object;

dividing each of said closed shapes into elements, each element including one of a straight line and an arc of a circle;

determining data which represents each of said elements including a position of said element and a shape of said element, at least one of said shapes including an arc of a circle;

forming a loop information data set as an aggregation of said data representing said elements;

providing existence data in said loop information data set, which represents whether each of said plurality of closed shapes represents an existence mode indicative of a shape to be included or a removal mode indicative of a shape to be removed; and providing output information indicative of said final shape based on said loop information data set and said existence data.

10. A method as in claim 9, wherein at least one of said shapes is totally within another.

11. A solid modeling method for producing information representing a shape of an object, comprising the steps of:

dividing a two-dimensional cross-section of an object into existing shapes, and removal shapes to be removed from said existing shapes to define a final shape;

dividing said two-dimensional cross-section of said existing shapes and removal shapes which define said final shape of said object into elements including both of straight lines and arcs of circles;

forming a two-dimensional wire frame in a first plane, said wire frame representing said two-dimensional cross-section of said object, by connecting neighboring ones of said elements;

expressing said wire frame by a loop information data set which includes an aggregation of data describing said elements and a mode attribute where said mode attribute is data having one of a plurality of possible values including an existence value and a removal value, said existence value being representative of existing shapes in said loop information data set of said final shape of said object and said removal value being representative of removal shapes in said final shape of said object;

determining additional surfaces of said object, which are outside said first plane including said wire frame, and expressing geometrical surfaces which define said surfaces outside said first plane;

providing output data representing said final shape based on said loop information data set expressed as existing shapes and removal shapes and said additional surfaces; and defining attribute information other than said shape information of said object which is composed of loop information data sets and representing said content of said object by linking said attribute information to said object.

12. A solid modeling method for producing information representing the shape of an object, said method comprising the steps of:

defining a boundary geometry of an object by a two-dimensional wire frame comprising a plurality of elements including straight lines and arcs of circles, said wire frame being formed by a loop connecting said elements in a predetermined order;

forming a three-dimensional solid geometry by a region formed by moving said loop to a position of a coordinate value predetermined on a coordinate axis perpendicular to a mother plane of said loop, said three-dimensional solid geometry being defined as a primitive which is represented by a loop information data set and an arbitrary object being represented by aggregation of plural primitives;

representing an existing part and a void part of said two dimensional wire frames comprising plural loops by an existing shape and removal shape, respectively, said plural loops being represented by a group of said loop information data sets, and said existing shape and said removal shape being represented by attribute information of said group of said loop information data set;

determining additional surfaces of each primitive by means of at least one mathematical expression; and providing output data representing said shape of said object on said basis of said group of said loop information data sets representing said existing shapes, said removal shape and said additional surfaces.

* * * * *

UNITED STATES PATENT AND TRADEMARK OFFICE
CERTIFICATE OF CORRECTION

PATENT NO. : 5,475,799
DATED : December 12, 1995
INVENTOR(S) : Yoshioka, et. al.

It is certified that error appears in the above-indentified patent and that said Letters Patent is hereby corrected as shown below:

Title page, item [63] should read-- Continuation of Ser. No. 967,544, October 27, 1992, abandoned, which is a continuation of Serial No. 465,563, filed December 7, 1989 as a continuation-in-part of PCT/JP89/00366, filed April 5, 1989, abandoned.

Signed and Sealed this

Fourth Day of June, 1996

Attest:

BRUCE LEHMAN

Attesting Officer          Commissioner of Patents and Trademarks